United States Patent
Henderson et al.

(10) Patent No.: US 7,252,432 B1
(45) Date of Patent: Aug. 7, 2007

(54) EFFICIENT METHOD OF SHARING DIODE PINS ON MULTI-CHANNEL REMOTE DIODE TEMPERATURE SENSORS

(75) Inventors: Richard Henderson, Sunnyvale, CA (US); Mehmet Aslan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 191 days.

(21) Appl. No.: 10/974,664

(22) Filed: Oct. 27, 2004

(51) Int. Cl.
*G01K 7/00* (2006.01)
*G01K 7/01* (2006.01)

(52) U.S. Cl. ............... 374/183; 374/178; 327/513

(58) Field of Classification Search ............... 374/183, 374/178, 163, 1; 327/512–513; 702/99, 702/130, 132–133
See application file for complete search history.

(56) References Cited

U.S. PATENT DOCUMENTS

| | | | |
|---|---|---|---|
| 5,982,221 A * | 11/1999 | Tuthill ................... | 327/512 |
| 6,008,685 A * | 12/1999 | Kunst .................... | 327/512 |
| 6,149,299 A * | 11/2000 | Aslan et al. ............ | 374/178 |
| 6,332,710 B1 | 12/2001 | Aslan et al. | |
| 6,554,469 B1 * | 4/2003 | Thomson et al. ....... | 374/178 |
| 6,736,540 B1 * | 5/2004 | Sheehan et al. ........ | 374/183 |
| 6,786,639 B2 * | 9/2004 | Covi et al. ............. | 374/178 |
| 6,808,307 B1 * | 10/2004 | Aslan et al. ............ | 374/178 |
| 6,934,645 B2 * | 8/2005 | Kim ....................... | 702/64 |
| 6,957,910 B1 * | 10/2005 | Wan et al. .............. | 374/183 |
| 2003/0035463 A1 * | 2/2003 | Breinlinger ............ | 374/178 |
| 2006/0039445 A1 * | 2/2006 | McLeod ................. | 374/178 |

OTHER PUBLICATIONS

LM83, Triple-Diode Inputo and Local Digital Temperature Sensor with Two-Wire Interface, *National Semiconductor Corporation*, Nov. 1999, pp. 1-20.
LM95221, Dual Remote Diode Digital Temeprature Sensor with SMBus Interface, *National Semiconductor Corporation*; May 2004, pp. 1-16.

* cited by examiner

*Primary Examiner*—Gail Verbitsky
(74) *Attorney, Agent, or Firm*—Darby & Darby (57) ABSTRACT

A multi-channel remote diode temperature sensor includes a variable current supply configured to provide a base or an elevated current, a bias circuit, an analog-to-digital converter having a first and second input terminals, a logic block and a switch arrangement. The switch arrangement cooperates with the logic block to electrically connect the current supply, bias circuit and analog-to-digital input terminals to first and second data pins. Pairs of anode-to-cathode connected remote diodes in electrical communication with the data pins are monitored by measuring the difference in forward voltages at the two currents. Reversal of the configuration of the switch arrangement paths permits monitoring of the other member of the anode-to-cathode remote diode.

20 Claims, 7 Drawing Sheets

FIG. 1A

PRIOR ART

PRIOR ART

EFFICIENT METHOD OF SHARING DIODE PINS ON MULTI-CHANNEL REMOTE DIODE TEMPERATURE SENSORS

FIELD OF THE INVENTION

The present invention relates to temperature sensor circuits and, in particular, to a multi-channel temperature sensor having a pair of input terminals which is configured to receive data from multiple remote temperature-sensing diodes.

BACKGROUND

When operated at a constant current, the voltage ($V_{for}$) of a forward-biased P/N diode exhibits a negative temperature coefficient of about −2 mV/° C. This property can be utilized to detect temperature. Unfortunately, the absolute value of $V_{for}$ varies according to diode composition and hence the process conditions under which the diode was fabricated. One approach to overcome such process-based variation in $V_{for}$ is to calibrate the current supplied across the P/N junction to match the variation in $V_{for}$ exhibited by a particular diode. However, such a calibration of individual current supplies is impractical for mass produced devices. Another approach is to detect a change in forward-biased diode voltage ($\Delta V_{for}$) for two different applied currents, 1X and NX, where NX is a known multiple of 1X. Specifically:

$$T = \frac{q \Delta V_{for}}{\eta k \ln(N)}, \text{ where} \tag{I}$$

T=absolute temperature (°K);
q=the charge on the carrier (electron charge);
$\Delta V_{for}$=change in forward-biased voltage;
η=ideality factor of diode.
k=Boltzman's constant; and
N=ratio of the two applied currents.

The premise of this approach is the principle that any uncertainty in diode behavior introduced by process variation is eliminated (i.e., cancelled out) by detecting a voltage change for two different currents flowing across the same diode.

Conventional temperature sensors utilize a positive data pin and a negative data pin to sense the forward-biased diode voltage of each diode. Thus, the number of data pins required to monitor a diode is double the number of diodes being monitored. This use of data pins places a burden of the minimal architecture of modern integrated circuits, thus limiting the data pins available for other functions.

DETAILED DESCRIPTION OF THE ILLUSTRATIVE EMBODIMENTS

By way of overview and introduction, a multi-channel remote diode temperature sensor is presented. The multi-channel temperature sensor is configured to receive current across a plurality of remote diodes via data pins, where the data pins are grouped in a manner which provides a minimum correspondence between diode terminals and data pins, thereby keeping the sensor's pin count to a minimum.

For simplicity purposes, a first illustrative embodiment of a multi-channel temperature sensor for monitoring two remote diodes will be described. The present invention is, however, equally applicable to, and suitable for, temperature sensors with any number of remote diodes.

Figure 1A:
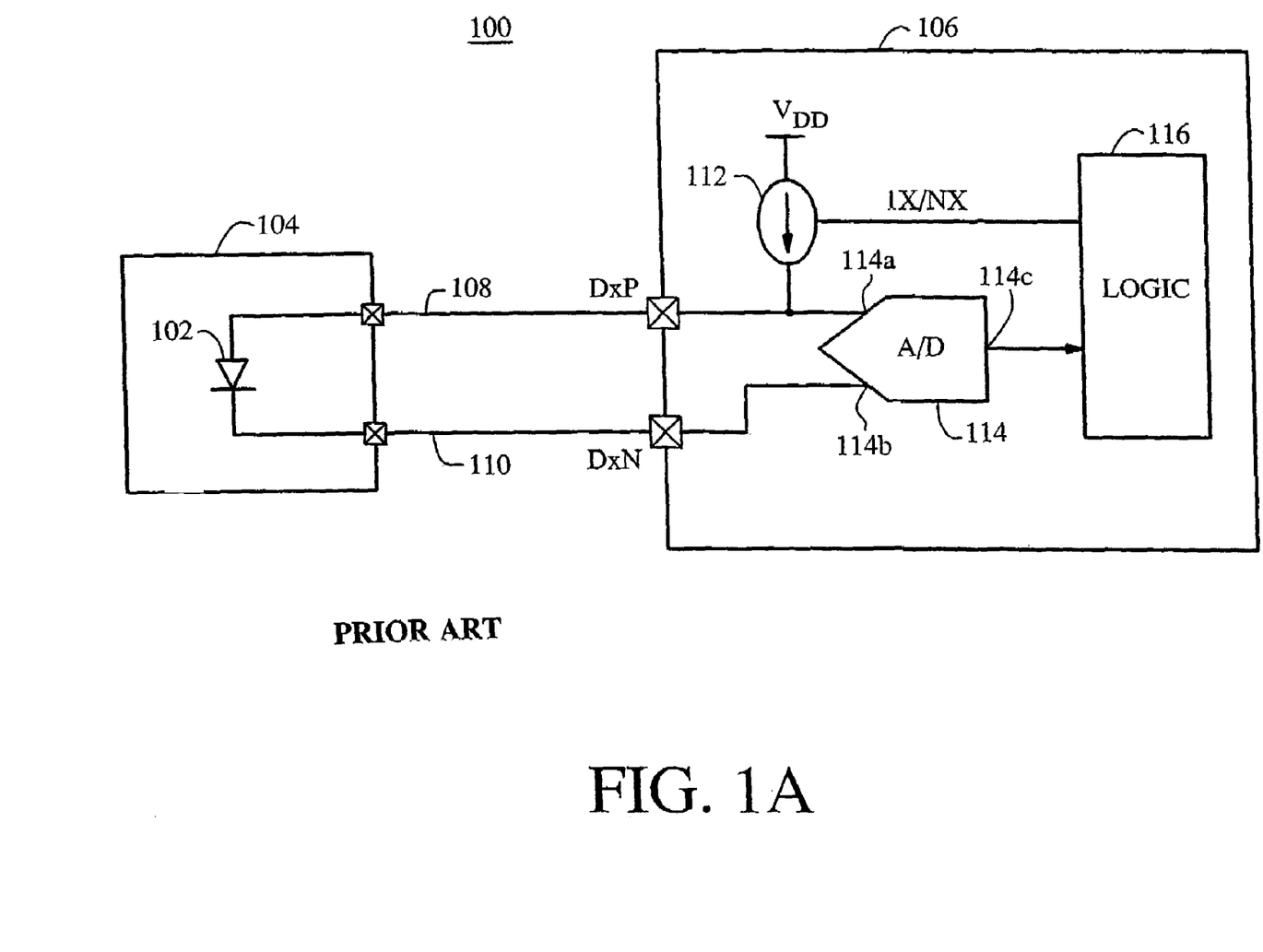
FIG. 1A illustrates a schematic diagram of one embodiment of a single-channel remote diode temperature sensor circuit.

Accordingly, FIG. 1A shows a schematic diagram of a temperature sensor circuit utilizing a one-to-one correspondence between diode terminals and data pins to detect temperature. Temperature sensor circuit 100 includes remote diode 102 positioned in remote device 104 and connected with temperature sensor 106 through output line 108 at positive data pin (DxP) and through input line 110 at negative data pin (DxN). While FIG. 1A depicts remote diode 102 as a simple diode, remote diode 102 can also take the form of the forward-biased emitter-base P/N junction of a PNP or NPN bipolar transistor.

Temperature sensor 106 also includes variable current supply 112 configured to communicate a current to positive data pin DxP. The output from variable current supply 112 is varied between a base current (1X) and a known multiple (NX) of the base current, as controlled by logic block 116.

Current output from the positive data pin DxP is communicated through output line 108 to remote diode 102. Current flows across remote diode 102, and is returned back through input line 110 to temperature sensor 106 at the negative data pin DxN.

Temperature sensor 106 includes analog-to-digital (A/D) converter 114 having first input terminal 114a, second input terminal 114b, and output terminal 114c. A current is flowed into remote diode 102, and first input terminal 114a experiences a first voltage corresponding to the flow of this current into remote diode 102.

A/D converter 114 receives, at second input terminal 114b, a second voltage corresponding to the current flowed across remote diode 102. This second voltage experienced at the second input terminal 114b is a function of (i.e., depends on) the potential drop across remote diode 102. A/D converter 114 samples the difference between the first and second voltages, converts this difference into a digital signal, and communicates this digital signal to logic block 116. A more detailed discussion of the operation of A/D converter 114 is presented below in conjunction with FIG. 1B.

Figure 1B:
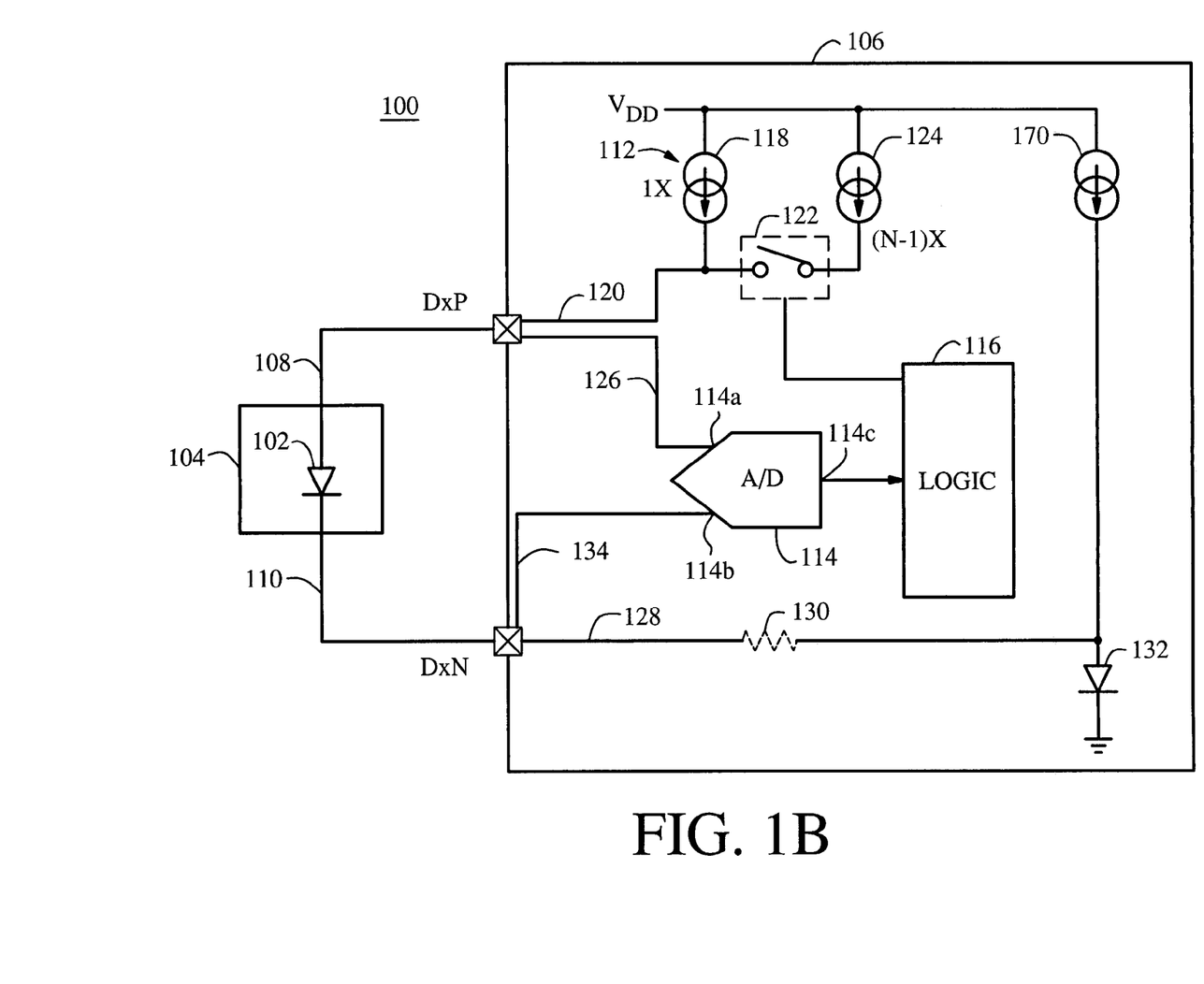
FIG. 1B illustrates a detailed view of circuitry of the single-channel remote diode temperature sensor circuit of FIG. 1A.

Precise operation of the temperature sensor circuit of FIG. 1A is explained in conjunction with FIG. 1B. FIG. 1B is a detailed view of the circuitry at the DxP pin and DxN pin of temperature sensor 106.

With reference to FIG. 1B, first constant current source 118 provides a base current 1X along first force line 120 to the DxP pin. First switch 122 selectively connects second constant current source 124 to first force line 120. Second constant current source 124 provides a supplemental current (N−1)X constituting a known multiple of the base current 1X output by first constant current source 118. The currents output by the first and second constant current sources 118 and 124 will vary somewhat with temperature, but the ratio of these currents will retain the integer relationship described herein.

First switch 122 is controlled by logic block 116. Initially, first switch 122 is deactivated, and first constant current source 118 alone communicates base current 1X to the DxP pin. The base current 1X flows out of the DxP pin, through output line 108, and across remote diode 102. The resulting voltage on the DxP pin is communicated along first sense line 126 to first input terminal 114a of A/D converter 114.

Current flowing across remote diode 102 is conveyed through input line 110 back to temperature sensor 106 at the DxN pin. This current, then, flows through second force line 128, exhibiting a parasitic resistance represented by resistor 130 in series with diode 132, into ground. Third current supply 170 is also in electrical communication with second force line 128. The resulting voltage on the DxN pin is communicated to second input terminal 114b of A/D converter 114 along second sense line 134.

During operation, A/D converter 114 samples the voltage difference across remote diode 102 caused by applying the two different currents; base current 1X and elevated current NX. The voltage drop ($V_{for1}$) across forward-biased remote diode 102 at the base current 1X is represented by the voltage difference between the DxP and DxN pins. Similarly, the voltage drop ($V_{for2}$) across forward-biased remote diode 102 at the elevated current NX is represented by the voltage difference between the DxP and DxN pins. These voltage differences ($V_{for1}$ and $V_{for2}$) are sampled by A/D converter 114.

U.S. Pat. No. 6,332,710, issued Dec. 25, 2001 and titled "Multi-Channel Remote Diode Temperature Sensor" has the same inventive entity and assignee as the present invention. U.S. Pat. No. 6,332,710 is hereby incorporated by reference in its entirety.

U.S. Pat. No. 6,332,710 provides a detailed description of the internal operation of one embodiment of the A/D converter 114 as it measures each of $V_{for1}$ and $V_{for2}$. In brief, switches internal to A/D converter 114 are correspondingly operated to allow the voltage on the DxP pin to be transferred to a first plate of a sampling capacitor internal to the A/D converter, and the voltage on the DxN pin to be transferred to a second plate of the sampling capacitor. The charge accumulated across the sampling capacitor corresponds to the difference between the voltages on pins DxP and DxN (i.e., $V_{for1}$ or $V_{for2}$; depending on the setting of first switch 122). The internal switches of the A/D converter 114 are then operated to transfer the charge accumulated on the sampling capacitor, less a charge retained by parasitic capacitances, to an inverting node of an operational amplifier. A feedback capacitor samples the voltage and transfers the voltage to comparator and logic circuitry for conversion into digital form. The digitized signal is output on output terminal 114c and then communicated to logic block 116. After this operation is repeated a suitable number of times (i.e., a suitable number of clock cycles) with first switch 122 in the open (deactivated) state so as to measure $V_{for1}$, first switch 122 is activated.

One skilled in the art will recognize that A/D converter 114 is implementable in any one of a variety of analog-to-digital converters suitable for use in temperature sensor circuits, as is known in the art. This includes but is not limited to delta-sigma A/D converters, incremental A/D converters, dual slope A/D converters, SAR A/D converters. This also includes A/D converters that employ signal conditioning techniques, as are known in the art, to improve the performance of the A/D converter for use in temperature sensor circuits. Such conditioning techniques include, but are not limited to, circuits that reduce the dynamic range of the A/D converter. This includes A/D converters utilizing sub-ranging circuits, various sampling circuits that sample and amplify the voltage to the A/D converter. Other signal conditioning circuits include filters and buffers that can be placed between the data pins and the inputs of the A/D converter.

Referring again to FIG. 1B, first constant current source 118 provides base current 1X to the DxP pin and second constant current source 124 provides supplemental current (N−1)X to the DxP pin, such that the DxP pin receives a total elevated current of NX. The corresponding output voltage on the DxP pin is communicated along first sense line 126 to first input terminal 114a of A/D converter 114.

The elevated current NX flows out of the DxP pin through output line 108 and across remote diode 102. Current flowing out of remote diode 102 is conveyed through input line 110 back to temperature sensor 106 at the DxN pin. This current then flows through second force line 128, exhibiting a parasitic resistance represented by resistor 130 in series with diode 132, into ground. The corresponding input voltage on the DxN pin is communicated along second sense line 134 to second input terminal 114b of A/D converter 114.

The difference between the voltage at the DxP pin and the voltage at the DxN pin represents the voltage drop $V_{for2}$ across forward-biased remote diode 102 at the elevated current NX. A/D converter 114 samples this voltage drop and subsequently generates on output terminal 114c a second digital signal corresponding to $V_{for2}$, in the manner previously described.

This second digital signal is fed to logic block 116, where it is compared with the previously stored $V_{for}$ to determine the charged forward-biased voltage $\Delta V_{for} = V_{for2} - V_{for1}$, and hence the temperature at remote diode 102 and remote device 104 pursuant to Equation (I).

Fluctuation of voltage at the DxN pin can substantially affect the accuracy of the sampled signal communicated in the logic block. Thus, where the remote diode is positioned in a noisy environment (e.g., near an active microprocessor), the resulting voltage fluctuation at the DxN pin could adversely affect the accuracy of the digital signal communicated to the logic block. The temperature sensor shown in FIG. 1A is limited to sensing temperature at a single remote location. However, in many applications, it is desirable to monitor ambient temperature at a plurality of remote locations (i.e., monitoring temperature at a CPU, battery and disk drive of a laptop computer). Adapting the temperature sensor circuit depicted in FIG. 1A to monitor temperatures at multiple remote locations uses a large amount of pins due to the multiplicity of positive and negative data pins. The same number of negative data pins is required as the number of positive data pins in such a temperature sensor configuration.

Figure 2:
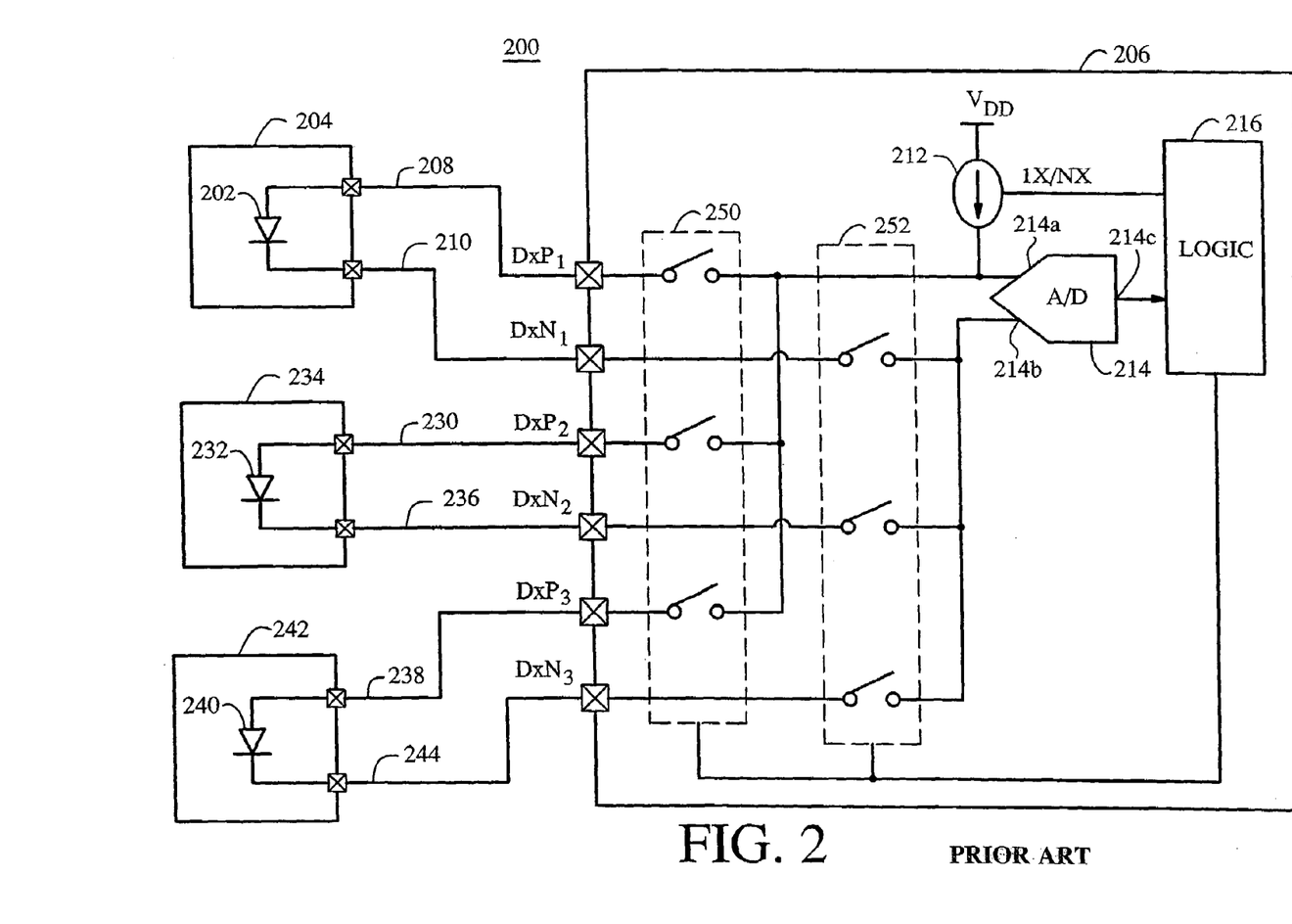
FIG. 2 illustrates a schematic diagrams of an embodiment of a multi-channel remote diode temperature sensor circuits.

For example, FIG. 2 illustrates such a temperature sensor adapted to monitor temperature at three remote locations. Temperature sensor circuit 200 features temperature sensor 206 with three positive data pins $DxP_{1-3}$ and three associated negative data pins $DxN_{1-3}$. Current output from first $DxP_1$ pin is communicated through first output line 208 to first diode 202 located in first remote device 204. Current flows across first diode 202 and is returned back through first input line 210 to temperature sensor 206 at first negative data pin $DxN_1$. Similarly, current output from the second $DxP_2$ pin and the third $DxP_3$ pin is, respectively, communicated through its own output line (230 and 238) to associated diode (232 and 240) located in an associated remote device (234 and 242). Thus, current flows across associated diode (232 or 240) and is returned back through associated input line (236 or 244) to temperature sensor 206 at second negative data pin $DxN_2$ and at third negative data pin $DxN_3$, respectively. Temperature sensor 206 includes two multiplexers, both controlled by logic block 216. First multiplexer 250 selectively connects the output of variable current supply 212 to any desired positive data pin, while second multiplexer 252 selectively connects second A/D input terminal 214b of A/D converter 214 to any desired negative data pin. Selective activation of first and second switches 250 and 252 permits A/D converter 214 to measure $\Delta V_{for}$ at currents 1X and NX for any desired diode.

Figure 3:
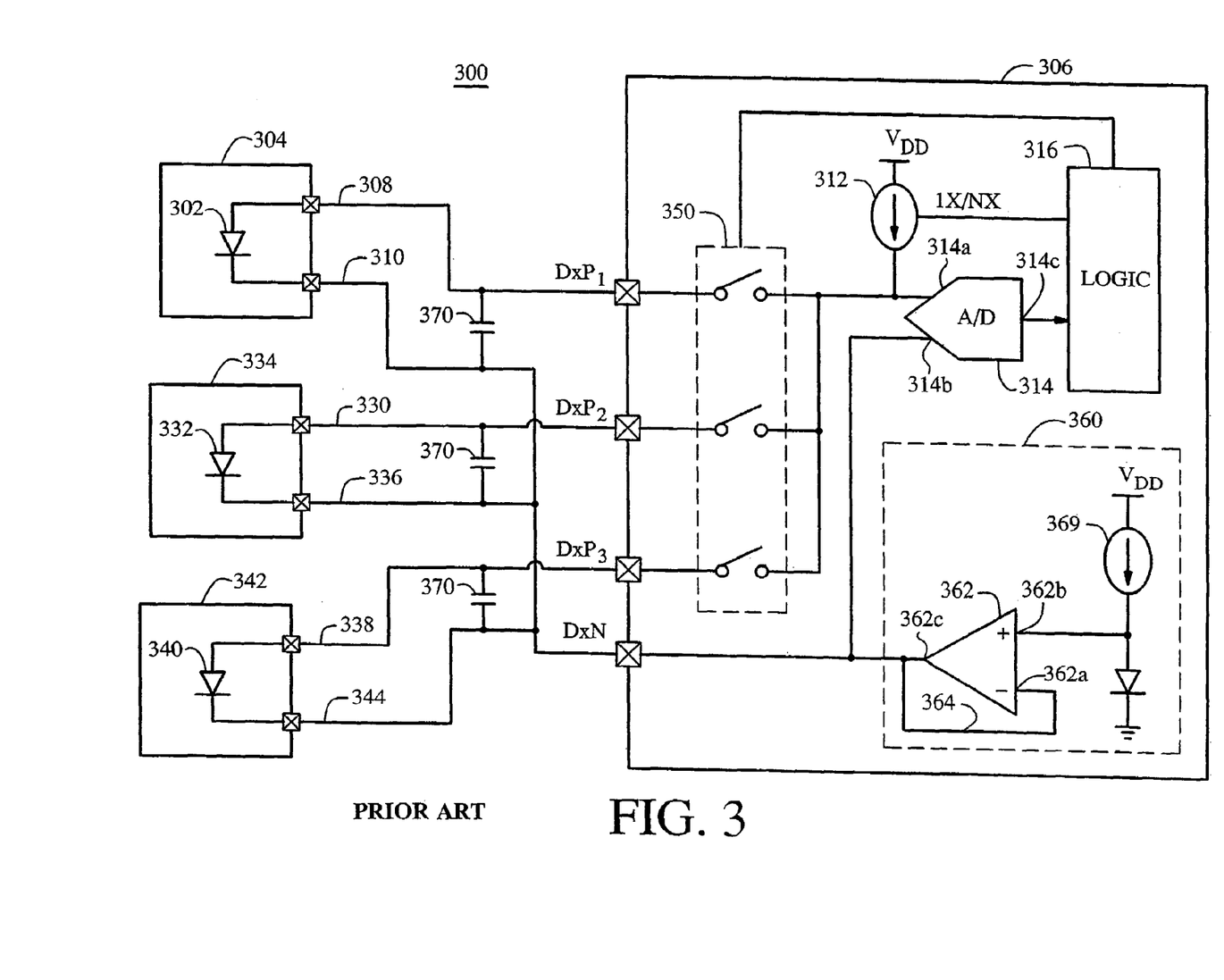
FIG. 3 illustrates a schematic diagrams of another embodiment of a multi-channel remote diode temperature sensor circuit.

FIG. 3 illustrates the invention of the U.S. Pat. No. 6,332,710, which depicts multi-channel temperature sensor 300 configured to receive current flow across three remote diodes, at a single input line and a single negative data pin. This configuration, which provides a single negative data pin for these remote diodes, allows a reduction in the pin count of the multi-channel temperature sensor shown in FIG. 2.

Multi-channel temperature sensor circuit 300 features temperature sensor 306 with three positive data pins $DxP_{1-3}$ and a single negative data pin DxN. Current output from first $DxP_1$ pin is communicated through first output line 308 to first diode 302 located in first remote device 304. Current flows across first diode 302 and is returned back through first input line 310 to temperature sensor 306 at the single negative data pin DxN. Similarly, current output from the second $DxP_2$ pin and the third $DxP_3$ pin is, respectively, communicated through its own output line (330 and 338) to associated diode (332 and 340) located in an associated remote device (334 and 342). Thus, current flows across associated diode (332 or 340) and is returned back through associated input line (336 or 344) to temperature sensor 306 at the single negative data pin DxN. Temperature sensor 306 includes a single multiplexer 350 controlled by logic block 316. Multiplexer 350 selectively connects the output of variable current supply 312 to any desired positive data pin, $DxP_{1-3}$. Selective activation of the switches within multiplexer 350 permits A/D converter 314 to measure $\Delta V_{for}$ at currents 1X and NX for any desired diode.

The temperature sensors illustrated in FIGS. 1A-2 require that two pins on the remote temperature sensor be used to monitor each remote diode. Thus, two pins are needed to monitor one remote diode, and six pins are needed to monitor three remote diodes. However, the temperature sensor 300, FIG. 3, improves upon this one-to-one correspondence of data pins to diode terminals by providing individual positive data pins and a single negative data pin to measure a plurality of remote diodes. For example, FIG. 3 shows four pins being used to monitor three diodes.

Figure 4:
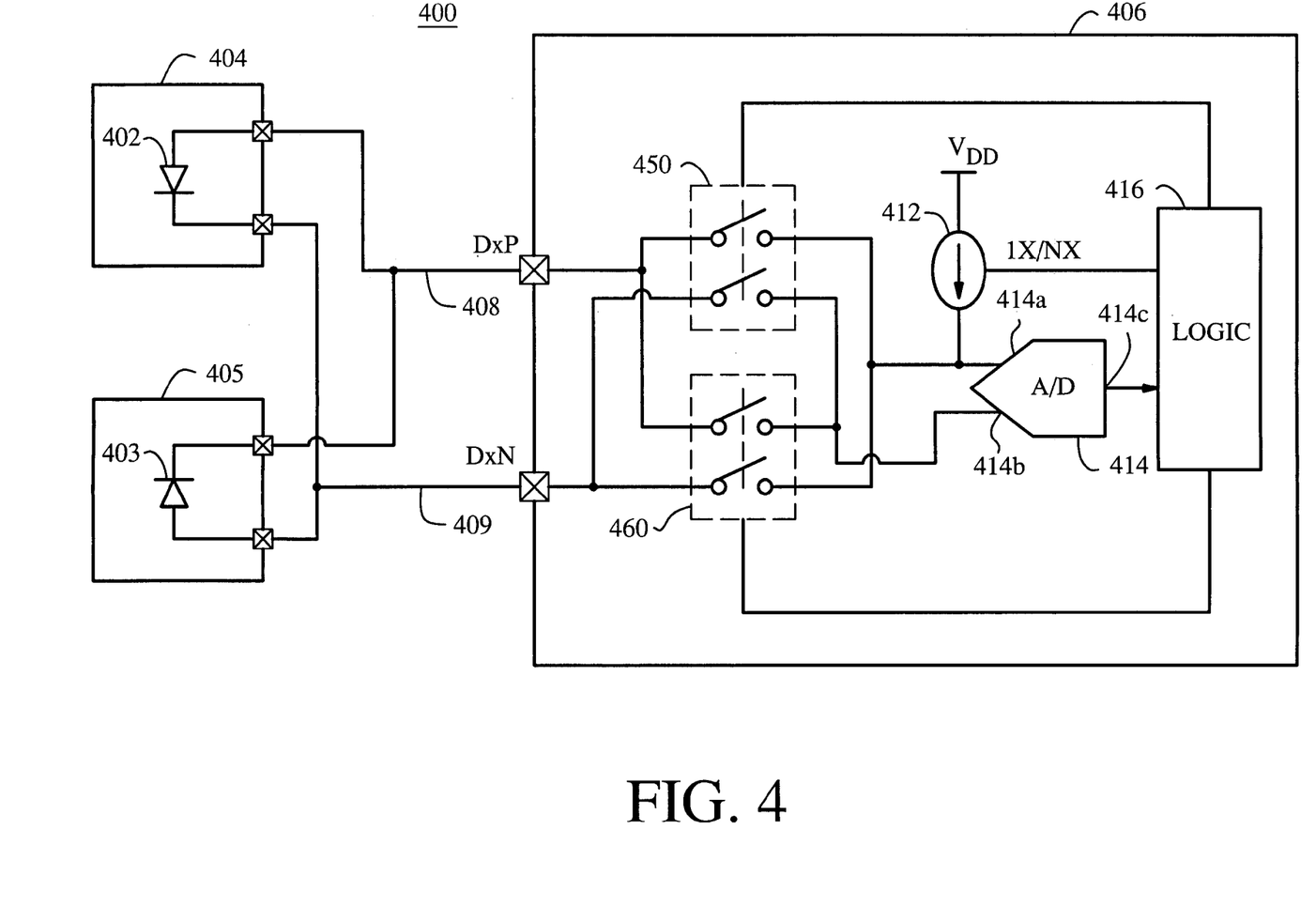
FIG. 4 illustrates a schematic diagram of another embodiment of a multi-channel remote diode temperature sensor circuit.

As illustrated in FIG. 4, a multi-channel temperature sensor circuit 400 includes a temperature sensor 406 with a variable current supply 412 configured to supply an output current to multiplexers 450 and 460. Current output from variable current supply 412 is varied between a base current (1X) and a known multiple (NX) of the base current. Multiplexers 450 and 460 are controlled by logic block 416. The output current is communicated through multiplexer 450 to data pin DxP, or through multiplexer 460 to data pin DxN. Because, as will be made clear in the following discussion, the current flowing through data pins DxP and DxN is reversible, the nomenclature "DxP" and "DxN" does not denote polarity. However the nomenclature will be used for clarity.

Data pin DxP is in electrical communication with first data line 408. First data line 408 is in electrical communication with the anode of first remote diode 402 of first remote device 404. First data line 408 is also in electrical communication with the cathode of second remote diode 403 of second remote device 405. Data pin DxN is in electrical communication with second data line 409. Second data line 409 is in electrical communication with the anode of second remote diode 403. Second data line 409 is also in electrical communication with the cathode of first remote diode 402.

Logic block 416 controls the activation and deactivation of multiplexers 450 and 460, thus setting the polarity of data pins DxP and DxN. The following discussion is based on the multiplexers 450, 460 having normally-open switches, where activation closes the switch and deactivation opens the switch. Normally-closed multiplexer switches can also be used by merely reversing the switch states and altering the control from logic block 416, as is known in the art. Further, other configurations for multiplexers 450 and 460 are within the scope of the invention. For instance, multiplexers 450 and 460 can be configured as one multiplexer or individual switches. Other switch arrangements, combinations, and interconnection paths are also within the scope of the invention. The invention is not limited by the actual implementation of the switch arrangement. Any configuration of switch arrangements that result in a reversal of the current flow through data pins DxP and DxN is within the scope of the invention.

By switching the current output from variable current supply 412 to either DxP or DxN, the two remote diodes 402, 403 can share the same pins. The diode being measured is forward biased and the other diode is reverse biased. Thus, the reverse biased diode will have no effect on the temperature reading under normal conditions. The reverse biased diode could effect the temperature reading should the diode have an unusually large reverse current.

As is understood by a person of ordinary skill in the art, the remote diodes depicted in this and other illustrations and embodiments can be formed from diodes, diode-connected transistors (i.e., where the base and collector are shorted together), or substrate PNP transistors implemented in CMOS technology, where the collectors are grounded as part of the production process. Other implementations of diodes are also within the contemplation of the diodes capable of being monitored by the present invention. Additionally, the remote diodes may be in separate devices, may be located within one device so that more than one temperature may be monitored within that device.

Again with reference to FIG. 4, temperature sensor 406 includes A/D converter 414 with first input terminal 414a, second input terminal 414b, and output terminal 414c. A detailed discussion of the operation of A/D converter 414 is presented below in conjunction with FIG. 5. First input terminal 414a of A/D converter 414 experiences a voltage corresponding to current flow from variable current supply 412 into remote diode 402 or remote diode 403. The second input terminal 414b of A/D converter 414 experiences a voltage corresponding to a current flow across remote diode 402 or remote diode 403. The difference between these two voltages is a function of the potential drop across the remote diode being monitored. A/D converter 414 samples the difference between these two voltages and converts it into a digital signal, which is subsequently communicated to logic block 416. The switch arrangement illustrated in FIG. 4 is a simplification, and places multiplexers 450, 460 in the signal path, which would result in an unacceptable resistance in the circuit.

Figure 5:
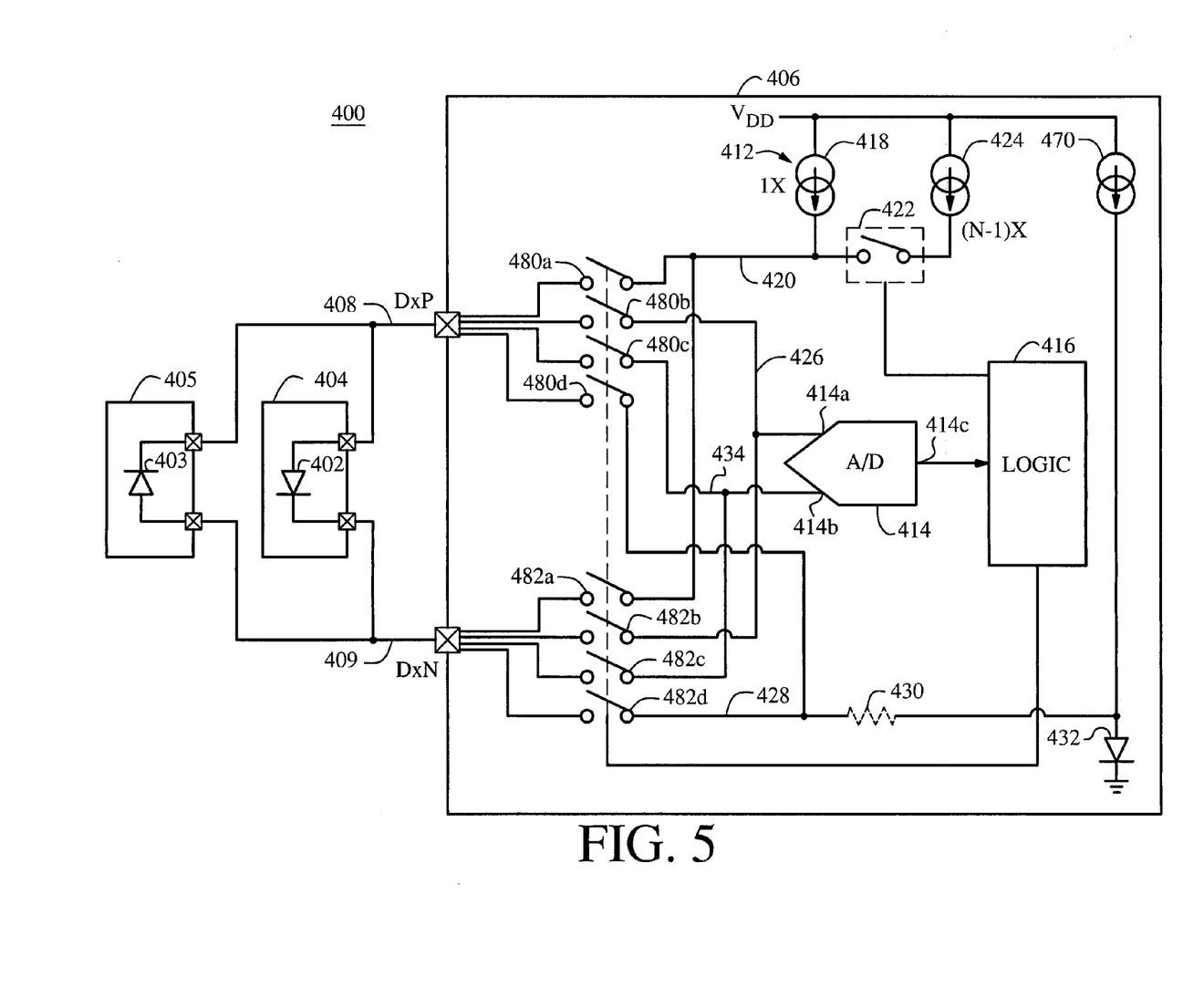
FIG. 5 illustrates a schematic diagram of an embodiment for the circuitry of the multi-channel remote diode temperature sensor of FIG. 4.

FIG. 5 illustrates an embodiment for the switch arrangement of the multi-channel temperature sensor 400 depicting force and sense connections. Precise operation of the multi-channel temperature sensor circuit 400 is explained in conjunction with FIG. 5. The switch arrangement depicted in FIG. 5 includes eight individual switches 480a-d, and 482a-d which are controlled by logic block 416. To monitor remote diode 402, switches 480a, 480b, 482c and 482d are closed, while 480c, 480d, 482a and 482d are open. First constant current source 418 provides a base current 1X along first force line 420, through switch 480a and to the DxP pin. Switch 422 selectively connects second current source 424 to first force line 420. Second constant current source 424 provides a supplemental current (N−1)X, constituting a known multiple of the base current (1X) output by first constant current source 418. The current output by first and second constant current sources 418 and 424 varies somewhat with temperature, but a current ratio maintains the aforementioned known relationship.

Switch 422 is controlled by logic block 416. Initially, switch 422 is deactivated, and first constant current source 418 alone provides base current 1X to the DxP pin. The resulting voltage on the DxP pin is communicated through switch 480b and along first sense line 426 to first input terminal 414a of A/D converter 414. The base current 1X flows out of the DxP pin and across the remote diode 402. Such current is conveyed back to temperature sensor 406 at the DxN pin. This forward bias current then flows, through switch 482d and along second force line 428, exhibiting a parasitic resistance represented by parasitic resistor 430 in series with diode 432, into ground. The voltage on the DxN pin is communicated through switch 482c and along second sense line 434 to second input terminal 414b of A/D converter 414.

Parasitic resistor 430 in series with diode 432 and current source 470 provide bias for the remote diode. Other alternative techniques and embodiments for providing bias and buffering are within the scope of the invention, as is known in the art. For instance, bias can be provided through parasitic resistor 430 to ground when the integrated circuit process technology operates at a voltage where the drop across diode 432 is too high to provide proper bias. The bias can also be provided by a buffer or amplifier circuit that provides a low impedance on the DxN pin, reducing the external noise coupled to the circuit. The bias can also be a simple resistor divider (e.g., a resistor divider between power and ground).

The voltage difference between the DxP pin and the DxN pin represents the voltage drop $V_{for1}$ across the forward-biased remote diode 402 at the base current 1X. Thereafter, as previously shown and described in connection with FIG. 1A, A/D converter 414 samples this voltage drop and generates on output terminal 414c a first signal, corresponding to the potential difference $V_{for1}$. This first signal is communicated to logic block 416 and then stored.

Next, second switch 422 is activated. First constant current source 418 provides base current 1X to the DxP pin. Second constant current source 424 also provides supplemental current (N−1)X to the DxP pin, such that the DxP pin receives a total elevated current of NX. The total current NX flows out of the DxP pin, through switch 480a, and across the remote diode. The corresponding output voltage on the DxP pin is communicated through switch 480b and along first sense line 426 to first input terminal 414a of A/D converter 414. Current flowing across the remote diode 402 is conveyed back to temperature sensor 406 at the DxN pin. This current then flows, through switch 482d and along second force line 428, exhibiting a parasitic resistance represented by parasitic resistor 430 in series with diode 432, into ground. A corresponding input voltage on the DxN pin is communicated through switch 482c and along second sense line 434 to second input terminal 414b of A/D converter 414.

The difference between the voltage at the DxP pin and the voltage at the DxN pin represents the voltage drop ($V_{for2}$) across the forward-biased remote diode 402 at the elevated current NX. The A/D converter 414 in the manner previously described, generates on output terminal 414c a second digital signal corresponding to $V_{for2}$. This second digital signal is fed to logic block 416, where it is compared with the previously stored $V_{for1}$ digital signal to determine the change in forward bias voltage $\Delta V_{for}$ across the diode 402 (i.e., $\Delta V_{for}=V_{for2}-V_{for1}$) and hence the temperature at a particular remote device (i.e., 404) pursuant to Equation (I).

To remotely monitor the temperature at remote device 405, remote diode 403 needs to be forward biased. Logic block 416 sends controls signals to switches 480a-d and 482a-d. For remote diode 403 to be forward biased switches 480c, 480d, 482a and 482b are closed, and switches 480a, 480b, 482c and 482d are opened. Current from current source 412 will flow along first force line 420, through switch 482a and to the DxN pin. The resulting voltage on the DxN pin is communicated through switch 482b and along first sense line 426 to first input terminal 414a of A/D converter 414. The current flows out of the DxN pin, through the remote diode 403 and returns to sensor 406 at the DxP pin. This forward bias current then flows, through switch 480d and along second force line 428, exhibiting a parasitic resistance represented by parasitic resistor 440 in series with diode 432, into ground. The voltage on the DxP pin is communicated through switch 480c and along second sense line 434 to second input terminal 414b of A/D converter 414.

As will be understood by a person of ordinary skill in the art, the order in which the current source provides the base current 1X and the elevated current NX does not affect the operation of the multi-channel temperature sensors of the present invention. Although the described embodiments discuss first providing the base current 1X and then the elevated current NX, the invention is not so limited.

Figure 6:
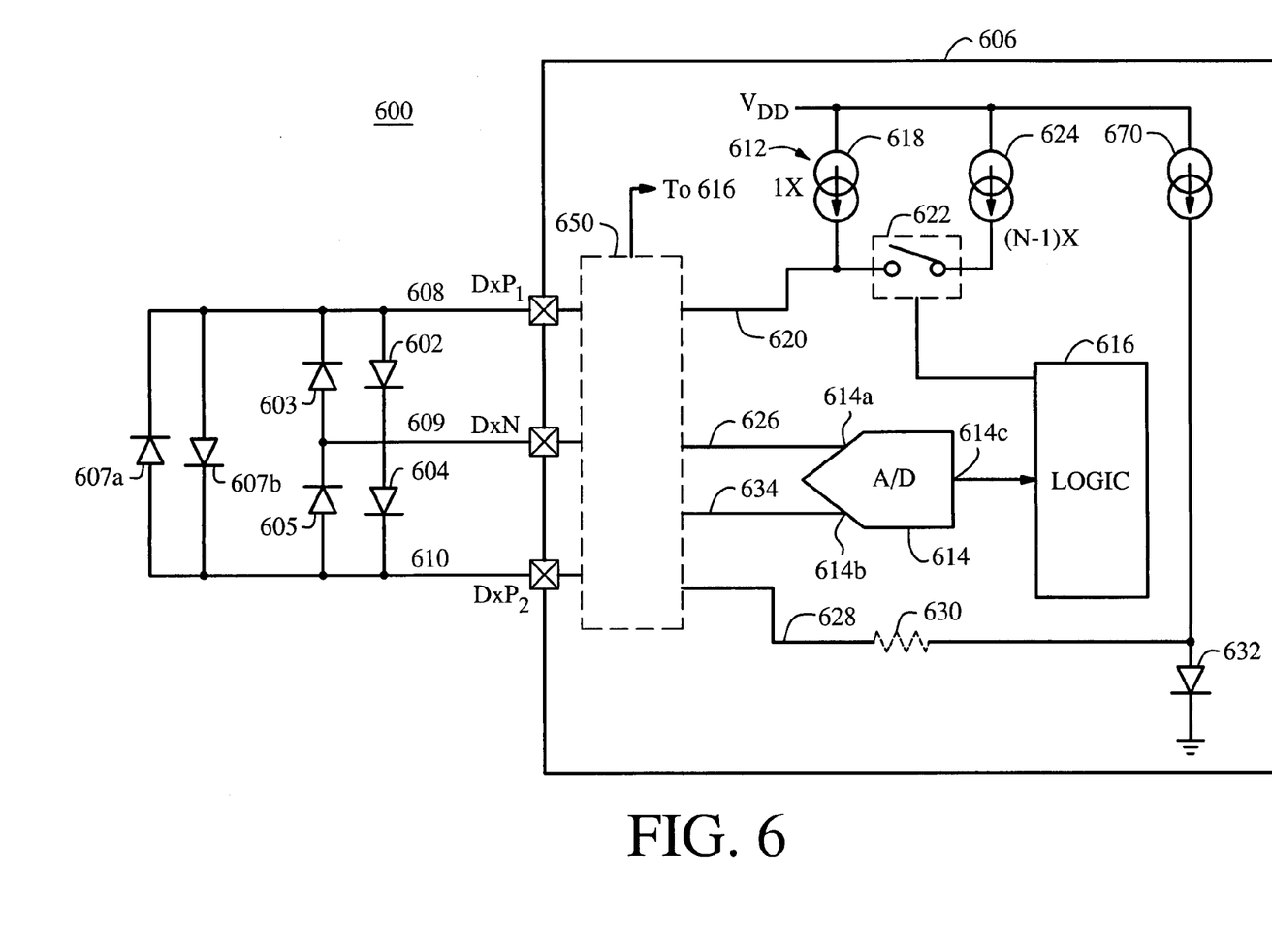
FIG. 6 illustrates a schematic diagram for another embodiment of a multi-channel temperature sensor.

FIG. 6 illustrates a schematic diagram for another embodiment of a multi-channel temperature sensor circuit. In this embodiment the multi-channel temperature sensor 606 is capable of monitoring four remote diodes (602-605) while only using three data pins ($DxP_1$, $DxP_2$, and DxN). First force line 620, second force line 628, first sense line 626, and second sense line 634 are connected to the three data pins through multiplexer 650 which is controlled by logic block 616. Multiplexer 650 is a switch arrangement through which the force and sense lines are electrically communicated to the proper data pins for monitoring a particular remote diode. For example, to monitor remote diode 602 the switch arrangement of multiplexer 650 is configured to connect the first force line 620 and the first sense line 626 to the data pin $DxP_1$. The second force line 628 and the second sense line 634 are connected to the DxN data pin. In this configuration remote diode 602 is forward biased. Reversal of these connections allows remote diode 603 to be forward biased, so that it may be monitored by the temperature sensor 606.

Connecting first force line 620 and first sense line 626 to data pin DxN, and connecting second force line 628 and second sense line 634 to data pin DxP$_2$ configures the temperature sensor 606 to monitor remote diode 604. Reversal of these connections allows monitoring of remote diode 605 to be accomplished.

As shown in FIG. 6 and demonstrated by the preceding discussion, the multi-channel temperature sensor 606 monitors four remote diodes using just three data pins. This unique configuration of electrically communicating input lines (i.e., 608, 609, 610) to three data pins on temperature sensor 606 decreases pin count in a multi-channel temperature sensor. Accordingly, the size of the multi-channel temperature sensor package can be reduced. By freeing pins on the package the invention allows the freed up pins to be used for other functions.

FIG. 6 also illustrates remote diodes 607a and 607b connected to the multi-channel temperature sensor 606. In this implementation, multiplexer 650 further includes a switch arrangement operable to electrically connect the first force line 620 and the first sense line 626 to the data pin DxP. The second force line 628 and the second sense line 634 are connected to the DxP$_2$ data pin. In this configuration remote diode 607b is forward biased. Reversal of these connections allows remote diode 607a to be forward biased, so that it may be monitored by the temperature sensor 606.

In one embodiment, when monitoring either of remote diodes 607a or 607b is to be performed, the voltage of data pin DxN is set to a bias voltage approximating the higher of DxP, or DxP$_2$ by the proper configuration of the switch arrangement of multiplexer 650. Setting the voltage of data pin DxN in this manner will reduce the leakage current present through the other diodes to a level that does not impact the monitoring of diodes 607a or 607b.

Thus, while there have been shown, described, and pointed out fundamental novel features of the invention as applied to several embodiments, it will be understood that various omissions, substitutions, and changes in the form and details of the devices illustrated, and in their operation, may be made by those skilled in the art without departing from the spirit and scope of the invention. Substitutions of elements from one described embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

We claim:

1. A temperature sensor comprising:
    a variable current supply in electrical communication with a switch arrangement through a first force line;
    a bias circuit in electrical communication with the switch arrangement through a second force line;
    an analog-to-digital converter having a first input terminal in electrical communication with the switch arrangement through a first sense line, a second input terminal in electrical communication with the switch arrangement through a second sense line, and an output terminal in electrical communication with a logic block;
    first and second data pins in electrical communication with the switch arrangement; and
    the logic block operatively coupled to the switch arrangement so as to electrically connect the first force line and the first sense line to one of the first and second data pins, and further electrically connect the second force line and the second sense line to the other of the first and second data pins;
    wherein the switch arrangement in cooperation with the logic block operatively reverses the first force line, the first sense line, the second force line and the second sense line electrical connections.

2. The temperature sensor of claim 1, wherein the variable current supply imparts a base current on the first force line.

3. The temperature sensor of claim 2, wherein the variable current supply further imparts an elevated current on the first force line, wherein the elevated current is a known multiple of the base current.

4. The temperature sensor of claim 1, wherein the bias circuit includes a constant current supply and a diode.

5. The temperature sensor of claim 1, wherein the bias circuit includes a resistance connected to ground.

6. The temperature sensor of claim 1, further comprising:
    a pair of diodes connected across the first and second data pins, wherein the diodes are anode-to-cathode connected.

7. The temperature sensor of claim 1, wherein the switch arrangement is a multiplexer.

8. A temperature sensor, comprising:
    a variable current supply in electrical communication with a switch arrangement through a first force line;
    a bias circuit in electrical communication with the switch arrangement through a second force line;
    an analog-to-digital converter having a first input terminal in electrical communication with the switch arrangement through a first sense line, a second input terminal in electrical communication with the switch arrangement through a second sense line, and an output terminal in electrical communication with a logic block;
    a plurality of pairs of data pins in electrical communication with the switch arrangement; and
    the logic block operatively coupled to the switch arrangement so as to electrically connect the first force line and the first sense line to one data pin in one pair of the plurality of data pins, and further electrically connect the second force line and the second sense line to the other data pin in one pair of the plurality of data pins;
    wherein the switch arrangement in cooperation with the logic block operatively reverses the first force line, first sense line, second force line and second sense line electrical connections, and further wherein the switch arrangement and logic block operatively cooperate to switch the first force line, the first sense line, the second force line and the second sense line electrical connections to other pairs of data pins.

9. The temperature sensor of claim 8, wherein the variable current supply imparts a base current on the first force line.

10. The temperature sensor of claim 9, wherein the variable current supply further imparts an elevated current on the first force line, wherein the elevated current is a known multiple of the base current.

11. The temperature sensor of claim 8, wherein the bias circuit includes a constant current supply and a diode.

12. The temperature sensor of claim 8, further comprising:
    a pair of diodes connected across each pair of the plurality of pairs of data pins, wherein the diodes are anode-to-cathode connected.

13. The temperature sensor of claim 8, wherein the switch arrangement is a multiplexer.

14. A temperature sensor comprising:
- a variable current supply in electrical communication with a switch arrangement through a first force line;
- a bias circuit in electrical communication with the switch arrangement through a second force line;
- an analog-to-digital converter having a first input terminal in electrical communication with the switch arrangement through a first sense line, a second input terminal in electrical communication with the switch arrangement through a second sense line, and an output terminal in electrical communication with a logic block;
- first, second and third data pins in electrical communication with the switch arrangement; and
- the logic block operatively coupled to the switch arrangement so as to electrically connect the first force line and the first sense line to one of the first, second and third data pins, and further electrically connect the second force line and the second sense line to one of the other among the first, second and third data pins;
- wherein the switch arrangement in cooperation with the logic block operatively reverses the first force line, the first sense line, the second force line and the second sense line electrical connections.

15. The temperature sensor of claim 14, wherein the variable current supply imparts a base current on the first force line.

16. The temperature sensor of claim 15, wherein the variable current supply further imparts an elevated current on the first force line, wherein the elevated current is a known multiple of the base current.

17. The temperature sensor of claim 14, wherein the bias circuit includes a constant current supply and a diode.

18. The temperature sensor of claim 14, further comprising:
- a first pair of diodes connected across the first and second data pins;
- a second pair of diodes connected across the second and third data pins, wherein the diodes are anode-to-cathode connected.

19. The temperature sensor of claim 14, further comprising:
- a pair of diodes connected across the first and third data pins, wherein the diodes are anode-to-cathode connected.

20. The temperature sensor of claim 14, wherein the switch arrangement is a multiplexer.

* * * * *

UNITED STATES PATENT AND TRADEMARK OFFICE
CERTIFICATE OF CORRECTION

| | | |
|---|---|---|
| PATENT NO. | : 7,252,432 B1 | Page 1 of 1 |
| APPLICATION NO. | : 10/974664 | |
| DATED | : August 7, 2007 | |
| INVENTOR(S) | : Henderson et al. | |

It is certified that error appears in the above-identified patent and that said Letters Patent is hereby corrected as shown below:

On the face page, in field (56), Under "Other Publications", in column 2, delete "Inputo" and insert -- Input --, therefor.

On the face page, in field (56), under "Other Publications", in column 2, delete "Temeprature" and insert -- Temperature --, therefor.

In column 4, line 39, delete "$V_{for}$," and insert -- $V_{for1}$ --, therefor.

In column 8, line 55, delete "$DXP_2$," and insert -- $DxP_2$, --, therefor.

In column 9, line 24, delete "DxP." and insert -- $DxP_1$. --, therefor.

In column 9, line 33, delete "DxP," and insert -- $DxP_1$ --, thefefor.

Signed and Sealed this

Twentieth Day of November, 2007

JON W. DUDAS
*Director of the United States Patent and Trademark Office*